US009942698B2

(12) United States Patent
Bernhardt et al.

(10) Patent No.: US 9,942,698 B2
(45) Date of Patent: Apr. 10, 2018

(54) HARVESTING COMMUNICATION PARAMETER OBSERVATIONS IN GNSS-DENIED ENVIRONMENTS

(75) Inventors: Bruce Allen Bernhardt, Wauconda, IL (US); Ali Ömer Mubarek, Ottawa (CA); Arnold Sheynman, Northbrook, IL (US); Michael Shenfield, Richmond Hill (CA)

(73) Assignee: BlackBerry Limited, Waterloo, ON (CA)

( * ) Notice: Subject to any disclaimer, the term of this patent is extended or adjusted under 35 U.S.C. 154(b) by 0 days.

(21) Appl. No.: 14/237,748

(22) PCT Filed: Aug. 9, 2011

(86) PCT No.: PCT/US2011/047151
§ 371 (c)(1),
(2), (4) Date: Feb. 7, 2014

(87) PCT Pub. No.: WO2013/022440
PCT Pub. Date: Feb. 14, 2013

(65) Prior Publication Data
US 2014/0171128 A1    Jun. 19, 2014

(51) Int. Cl.
*H04W 24/00* (2009.01)
*H04W 4/02* (2018.01)
(Continued)

(52) U.S. Cl.
CPC ............ *H04W 4/02* (2013.01); *G01S 5/0257* (2013.01); *G01S 19/48* (2013.01)

(58) Field of Classification Search
CPC .. H04W 64/00; H04W 4/02; H04L 29/08657; G01S 19/14; G01S 5/02; G01S 5/0252; G01S 19/48
(Continued)

(56) References Cited

U.S. PATENT DOCUMENTS 8,284,748 B2 * 10/2012 Borghei .................. H04W 4/08
370/252
8,320,939 B1 * 11/2012 Vincent ................... G01S 19/48
370/338
(Continued)

FOREIGN PATENT DOCUMENTS

EP      1471688        10/2004
EP      2249176 A1 *   11/2010    ............. G01S 11/06

OTHER PUBLICATIONS

International Preliminary Report on Patentability in International Application No. PCT/US2011/047151, dated Feb. 20, 2014, 7 pages.
(Continued)

*Primary Examiner* — Kathy Wang-Hurst
*Assistant Examiner* — B. M. M Hannan
(74) *Attorney, Agent, or Firm* — Fish & Richardson P.C.

(57) ABSTRACT

A method includes receiving location information from a mobile device, the location information indicating a location of a mobile device operating the mobile device in a global positioning navigation satellite system (GNSS)-location-denied environment. One or more communication parameters associated with communications between the mobile device and a network can be identified. The communication parameters can be associated with the location of the mobile device. The mobile device can provide the location information using a social networking site, for example, using a check-in feature or drop-down location menu.

17 Claims, 7 Drawing Sheets

(51) Int. Cl.
*G01S 5/02* (2010.01)
*G01S 19/48* (2010.01)

(58) Field of Classification Search
USPC ............... 455/404.2, 414.2, 440, 456.1–457
See application file for complete search history.

(56) References Cited

U.S. PATENT DOCUMENTS

| | | | | |
|---|---|---|---|---|
| 2002/0072379 | A1* | 6/2002 | Chen | G06F 17/30241 |
| | | | | 455/456.6 |
| 2005/0113113 | A1* | 5/2005 | Reed | H04L 12/5895 |
| | | | | 455/456.3 |
| 2006/0251034 | A1* | 11/2006 | Park | H04W 4/02 |
| | | | | 370/338 |
| 2007/0202888 | A1* | 8/2007 | Brachet | G01S 5/02 |
| | | | | 455/456.1 |
| 2008/0287140 | A1* | 11/2008 | Lee | H04W 64/00 |
| | | | | 455/456.2 |
| 2010/0113063 | A1* | 5/2010 | Han | G01S 5/02 |
| | | | | 455/456.1 |
| 2010/0198814 | A1* | 8/2010 | Petersen | G06Q 10/10 |
| | | | | 707/722 |
| 2010/0233999 | A1* | 9/2010 | Loeb et al. | 455/414.1 |
| 2010/0240398 | A1* | 9/2010 | Hotes | H04L 63/102 |
| | | | | 455/456.2 |
| 2010/0255856 | A1* | 10/2010 | Kansal et al. | 455/456.1 |
| 2010/0291949 | A1* | 11/2010 | Shapira | G01S 19/48 |
| | | | | 455/456.1 |
| 2010/0325194 | A1* | 12/2010 | Williamson | H04W 4/02 |
| | | | | 709/203 |
| 2011/0034179 | A1* | 2/2011 | David | G01S 5/0236 |
| | | | | 455/456.1 |
| 2011/0070863 | A1* | 3/2011 | Ma | H04W 4/02 |
| | | | | 455/410 |
| 2011/0081922 | A1* | 4/2011 | Chandra | H04W 4/206 |
| | | | | 455/457 |
| 2011/0137881 | A1* | 6/2011 | Cheng | G06F 17/3087 |
| | | | | 707/706 |
| 2011/0250903 | A1* | 10/2011 | Huang | G01S 5/0263 |
| | | | | 455/456.1 |
| 2012/0028650 | A1* | 2/2012 | Cooper | G01S 5/0294 |
| | | | | 455/456.1 |
| 2012/0040653 | A1* | 2/2012 | Mendis | G01S 5/0252 |
| | | | | 455/414.2 |
| 2012/0047129 | A1* | 2/2012 | Redstone | G06F 17/3087 |
| | | | | 707/723 |
| 2012/0197724 | A1* | 8/2012 | Kendall | 705/14.58 |
| 2012/0208549 | A1* | 8/2012 | Lau | G01S 5/02 |
| | | | | 455/456.1 |
| 2012/0302256 | A1* | 11/2012 | Pai | H04W 4/02 |
| | | | | 455/456.2 |
| 2013/0036009 | A1* | 2/2013 | Heiser et al. | 705/14.53 |
| 2013/0073422 | A1* | 3/2013 | Moore | G06Q 10/10 |
| | | | | 705/26.7 |

OTHER PUBLICATIONS

International Search Report and Written Opinion of the International Searching Authority issued in International Application No. PCT/US2011/047151 dated Dec. 22, 2011; 9 pages.
Communication Pursuant to Article 94(3) EPC issued in European Application No. 11745676.4 dated Jul. 24, 2017; 3 pages.

* cited by examiner

HARVESTING COMMUNICATION PARAMETER OBSERVATIONS IN GNSS-DENIED ENVIRONMENTS

CLAIM OF PRIORITY

This application is a U.S. National Stage of PCT/US2011/047151 filed on Aug. 9, 2011.

TECHNICAL FIELD

The present disclosure relates to harvesting communication parameter observations in global navigation satellite systems (GNSS) denied environments to enable mobile devices to ascertain geographical locations.

BACKGROUND

In many instances, users carrying electronic mobile devices may enter a building structure that blocks reception of GNSS signals. GNSS, in general, includes global positioning systems (GPS), Galileo, Global Navigation Satellite System (GLONASS (Russia)) and Compass, as well as other systems. Traditionally, geographical positions such as altitude, longitude and latitude can be calculated with GNSS signals of four or more satellites. The geographical information may enhance social interaction. Using GNSS signals for identifying geographical positions can sometimes be limiting or impossible if the environment denies reception of the GNSS signal, such as in a building, a basement, underwater, etc.

DESCRIPTION OF DRAWINGS

Like reference symbols in the various drawings indicate like elements.

DETAILED DESCRIPTION

Radio parameters can be harvested to create a set of observations for building a database of transmitter locations. Mobile devices can gather the radio parameters at a user's location to build up a set or sets of observations for further processing and refinement of the database.

The present disclosure describes methods, systems, and apparatuses for identifying user locations in GNSS-denied areas from such shared public location information on social network applications via mobile devices such as cellular phone, PDA, tablet PC, netbook, personal computer, etc. Users may inform others about public locations using social network applications on smartphones or other mobile devices (e.g., so-called "check-in" features). A user may want to share his or her location with others, and, consequently, is motivated to provide an accurate description of their location. Many times, such a location is at a public place or venue that has value to help build or improve upon the accuracy of indoor location technology. The location usually does not come in the form of a GNSS coordinate, but rather, in the name of a business or public place. Example social networking applications include checking in via FACEBOOK places, FOURSQUARE, online reservation applications (such as, but not limited to, OPENTABLE restaurant reservation application) or other social information sharing applications. This disclosure describes methods, systems, and apparatuses where the place information is harvested from the check-in process to form the location portion of the observation and coupled with any relevant radio parameter information to form the overall observation data. This data is then harvested from multiple devices to form a set of observations for further processing.

The mobile devices may have wireless connections through a cellular data network, wireless internet network, and/or other radio networks that enable modulation and demodulation. The identified locations can be coupled with radio parameter information or other communications information about the network to build a database, which may be used to identify device locations based on the radio parameters. For example, data about one or several devices can be aggregated, and used in the future to statistically predict the location of a device.

The present disclosure utilizes the characteristics of wireless communication and a database built by user input on social networking applications to correlate communication parameters with geographical information. This enables future inquiry for geographical information with limited communication parameters and returning an answer for the inquiry. Back-end algorithms may be used to improve the accuracy in correlation and identification, as well as to extract relevant information from different descriptions.

Figure 1:
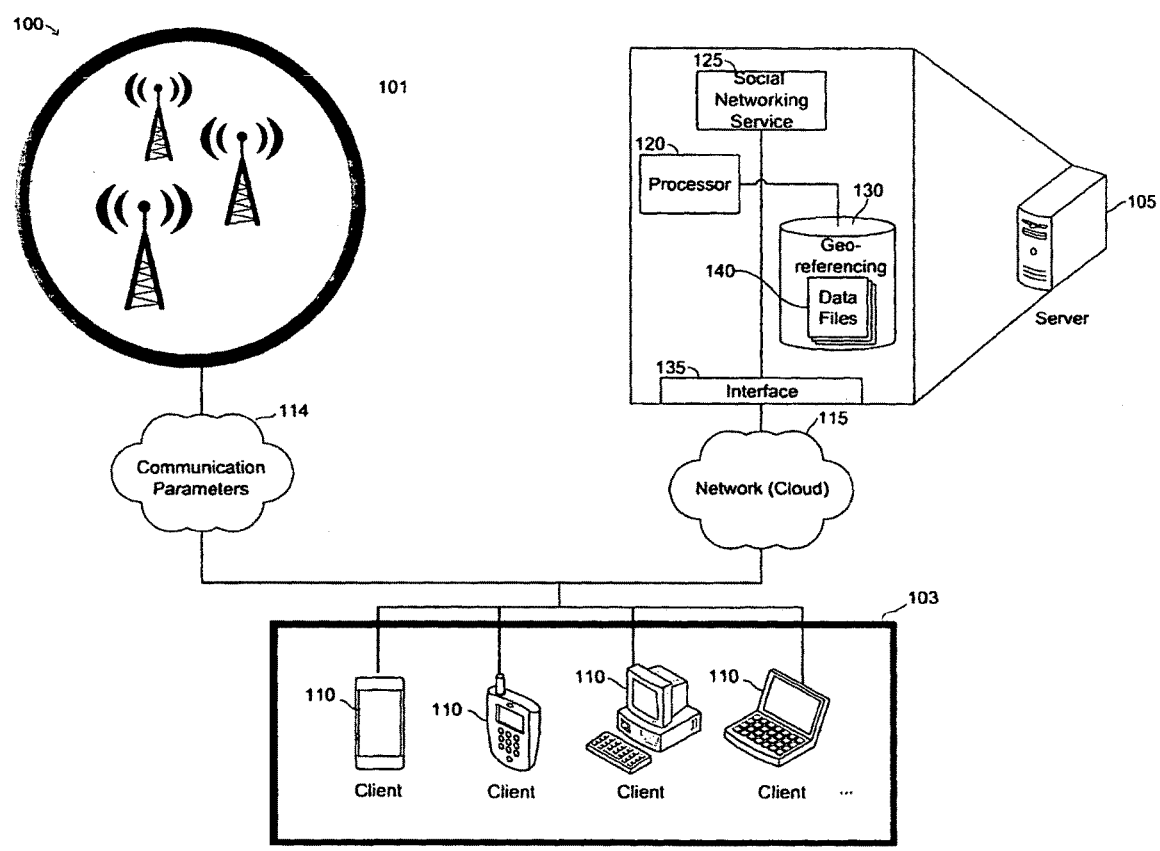
FIG. 1 is a schematic illustration of an example communication parameter observation harvesting system in accordance with the present disclosure.

FIG. 1 illustrates an example communication parameter observation harvesting system 100 in accordance with the present disclosure. The system 100 (used interchangeably with "environment 100") includes a number of communication towers 101, a number of communication devices (also referred to as clients) 110 operating in a GNSS-denied environment 103, and a server 105 coupled with the communication towers 101 and the communication devices 110 via a network 115. In general, the system 100 depicts an example configuration capable of dynamically determining the particular application's mode of operation in response to requests from users communicating through an interface 135.

The communication towers 101 may be a site where antennas and electronic communications equipment are placed, usually on a radio mast, tower or other high places (such as buildings), to create a cell in a cellular network. The elevated structure typically supports antennas, and one or more sets of transmitter/receivers, digital signal processors, control electronics, a GNSS receiver for timing (for CDMA2000/IS-95 or GSM systems), primary and backup electrical power sources, and sheltering. In GSM networks, the communication towers 101 are called Base Transceiver Stations (BTS). Depending on an operator's technology, even a site hosting just a single mobile operator may house multiple base stations, each to serve a different air interface technology (CDMA2000 or GSM, for example).

The communication tower 101 may cover a range determined by these factors: signal frequency, transmitter rated power, required uplink/downlink data rate of subscriber's device, transmitter size, directionality, weather conditions, etc. The communication tower 101 can be a general cell site. In some implementations, cell sites are grouped in areas of high population density, with the most potential users. Cell phone traffic through a single cell mast is limited by the mast's capacity; there are a finite number of calls or data traffic that a mast can handle at once, requiring overlapping coverage with a multiple of cell sites. In suburban areas, masts are commonly spaced 1-2 miles (2-3 km) apart, and in dense urban areas, masts may be as close as ¼-½ mile (400-800 m) apart. GSM base stations may be upto 30 km apart.

Although the communication tower 101 is described to be sites for cellular networks, other wireless networks, such as radio signal transmitters, wireless internet signal transmitters, and transmitters at other frequency ranges, can be considered as the communication towers 101 described herein.

The GNSS-denied environment 103 may be buildings, tree canopies, and some terrain features. This is because GNSS receivers require a line of sight to the satellites in order to obtain a signal representative of the true distance from the satellite to the receiver. Therefore, any object in the path of the signal has the potential to interfere with the reception of that signal. Further, reflective surfaces can cause the GNSS signals to bounce before arriving at a receiver, thus causing an error in the distance calculation. This problem, known as multipath, can be caused by a variety of materials including water, glass and metal. The water contained in the leaves of vegetation can produce multipath errors. In some instances, operating under heavy, wet forest canopy can degrade the ability of a GNSS receiver to track satellites. In some embodiments, the GNSS-denied environment 103 may be a supermarket, a mall, a theater, a cinema, a concert hall, a parking garage building, a subway station, an office building, or a store, as examples.

The mobile devices 110 may be carried by users in and out of various sub-locations inside the environment 103. For example, the mobile devices 110 may be carried from one department store to another in a shopping mall. The mobile devices 110 may be any electronic devices that can connect with the communication tower 101 and/or a network 115. In some implementations, the mobile devices 110 are smart phones, personal computers with cellular network adapters, and computational devices with native network adapters. For example, the mobile devices 110 can be a tablet appliance, a netbook, a laptop, a desktop, a camera, a cellular phone, and/or other devices that enable users to interact via a user interface with social networking applications. The mobile devices 110 illustrated in FIG. 1 are also clients to the server 105.

The mobile devices 110 are in communication with the communication towers 101 and the network 115 via a wireless link 150. The wireless link 150 illustrates the respective connection between each individual device and the communication tower 101, as well as the network 115. Each mobile device 110 has an independent wireless connection to the communication tower 101 and the network 115. The wireless connection may have distinctive communication parameters 114 in correspondence to its geographical locations. The communication parameters 114 may include, but are not limited to, received signal strength from one or more communication towers 101 or from Wi-Fi beacons at home or work addresses; country code; base station sector; cell site neighbor information; timing information; motion status; etc.

In general, the server 105 is any server that stores one or more hosted social networking services 125, where at least a portion of the hosted social networking services 125 are used via requests and responses sent to users within and communicably coupled to the system 100. In some instances, the server 105 may store a plurality of various hosted social networking services 125, while in other instances, the server 105 may be a dedicated server meant to store and provide only a single hosted social networking service 125. For example, the social networking services 125 may be a hosted or local application run on the device 110 that provides an interface to the user to, e.g., set up an account to upload personal information such as name, profile, contact, geo-location, photo, video, events, etc. and to connect with other user accounts to form an online social network, such as TWITTER, FACEBOOK, GOOGLE BUZZ, GOOGLE+, or any other social networking service that provides users to report their geographical locations.

In some instances, the server 105 may comprise a web server, where the hosted social networking services 125 represent one or more web-based applications accessed and executed via network to perform the programmed tasks or operations of the hosted social networking service 125. For example, the programmed task may be an automatic identification of entering a public location, such as a restaurant, a library, a supermarket, a movie theater, a fair park, a theme park, an airport, a train station, a subway station, a classroom, etc. The programmed task may also log related data such as calendar events, time, and invitations, with the location and publish such via the hosted social networking service 125.

At a high level, the server 105 comprises an electronic computing device operable to receive, transmit, process, store, or manage data and information associated with the system 100. In addition to requests from users via the interface 135, requests associated with the hosted social networking service 125 may also be sent from users connected via a network, external or third-party customers, other automated applications, as well as any other appropriate entities, individuals, systems, or computers. As used in the present disclosure, the term "computer" is intended to encompass any suitable processing device. For example, although FIG. 1 illustrates a single server 105, system 100 can be implemented using two or more servers 105, as well as computers other than servers, including a server pool. Indeed, server 105 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 105 may be adapted to execute any operating system, including Linux, UNIX, Windows, Mac OS, or any other suitable operating system or system environment such as Citrix.

In the present implementation, and as shown in FIG. 1, the server 105 includes a processor 120, an interface 135, and a geo-referencing database 130 storing one or more geo-referencing data files 140. The interface 135 is used by the server 105 for communicating with other systems in a client-server or other distributed environment (including within environment 100) connected via a network (not shown). Generally, the interface 135 comprises logic encoded in software and/or hardware in a suitable combination and operable to communicate with the network. More specifically, the interface 135 may comprise software supporting one or more communication protocols associated with communications such that the network or interface's hardware is operable to communicate physical signals within and outside of the illustrated environment of system 100.

Generally, the network facilitates wireless and/or wireline communications between the components of the system 100 (i.e., between the server 105 and user), as well as with any other local or remote computer, such as additional clients 110, servers, or other devices communicably coupled to network but not illustrated in FIG. 1. The network may be a continuous or discontinuous network without departing from the scope of this disclosure, so long as at least a portion of the network may facilitate communications between senders and recipients. The network may be all or a portion of an enterprise or secured network, while in another instance, at least a portion of the network may represent a connection to the Internet. In some instances, a portion of the network may be a virtual private network (VPN), such as, for example, the connection between a client computer and the server 105.

Further, all or a portion of the network connected with the server 105 via the interface 135 can comprise either a wireline or wireless link. Example wireless links may include 802.11a/b/g/n, 802.10, LTE, and/or any other appropriate wireless link. In other words, the network encompasses any internal or external network, networks, sub-network, or combination thereof operable to facilitate communications between various computing components inside and outside the illustrated environment of the system 100. The network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 105 includes a processor 120. Although illustrated as a single processor 120 in FIG. 1, two or more processors may be used according to particular needs, desires, or particular embodiments of the system 100. Each processor 120 may be a central processing unit (CPU), a blade, an application specific integrated circuit (ASIC), a field-programmable gate array (FPGA), or another suitable component. Generally, the processor 120 executes instructions and manipulates data to perform the operations of server 105 and, specifically, the one or more social networking services 125. Specifically, the server's processor 120 executes the functionality required to receive and respond to requests from the client(s) 110 and their respective client applications, as well as the functionality required to perform the other operations of the hosted social networking service 125. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including Fortran, C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system 100, processor 120 executes one or more hosted social networking services 125 on the server 105.

At a high level, the one or more hosted social networking services 125 can be any application, program, module, process, or other software that may execute, change, delete, generate, or otherwise manage information according to the present disclosure, particularly in response to and in connection with one or more requests received from the user and their associated client applications. In certain cases, only one hosted social networking service 125 may be located at a particular server 105. In others, a plurality of related and/or unrelated hosted social networking service 125 may be stored at a single server 105, or located across a plurality of other servers 105, as well. In certain cases, environment 100 may implement a composite hosted social networking service 125. For example, portions of the composite application may be implemented as web page, a web service using SOAP or CORBA, or similar client-service framework The hosted social networking service 125 may be accessed and executed by remote users or client applications via a network (e.g., through the Internet). Further, while illustrated as internal to server 105, one or more processes associated with a particular hosted social networking service 125 may be stored, referenced, or executed remotely. For example, a portion of a particular hosted social networking service 125 may be a web service associated with the application that is remotely called, while another portion of the hosted social networking service 125 may be an interface object or agent bundled for processing at a remote client 110. Moreover, any or all of the hosted social networking services 125 may be a child or sub-module of another software module or enterprise application (not illustrated) without departing from the scope of this disclosure. Still further, portions of the hosted social networking service 125 may be executed by a user working directly at server 105, as well as remotely at client 110.

The server 105 also includes the geo-referencing database 130. Geo-referencing database 130 may include any memory or database module and may take the form of volatile or non-volatile memory including, without limitation, magnetic media, optical media, random access memory (RAM), read-only memory (ROM), removable media, or any other suitable local or remote memory component. Geo-referencing database 130 may store various objects or data, including the geo-referencing data files 140. In some embodiments, the geo-referencing data files 140 may store, define, and/or save specific data about a particular location and its corresponding communication parameters. The data may include data regarding location address, description, relative position with other locations, distance to a landmark, and direction instructions.

The geo-referencing data files 140 may record a number of sets of communication parameters and the corresponding input from users regarding geographical locations. For example, users may use a check-in function of certain social networking applications to report a geographical observation. This report is sent together with communication parameters 114. The accumulation with such data pair builds a database that, with certain back-end processing, extracts location information with its communication parameters 114. The geo-referencing data files 140 are then able to provide geographical information given certain communication parameters 114.

The illustrated environment of FIG. 1 may also include one or more clients 110. Each client 110 may be any computing device operable to connect to or communicate with at least the server 105 and/or via the network 115 using a wireline or wireless connection. Further, each client 110 includes a processor, an interface (e.g. a graphical user interface, or "GUI"), a client application, and a memory. In general, each client 110 comprises an electronic computer device operable to receive, transmit, process, and store any appropriate data associated with the environment 100 of FIG. 1. It will be understood that there may be any number of clients 110 associated with, or external to, environment 100. Additionally, there may also be one or more additional clients 110 external to the illustrated portion of environment 100 that are capable of interacting with the environment 100 via a network. Further, the term "client 110" and "user" may be used interchangeably as appropriate without departing from the scope of this disclosure. Moreover, while a client 110 is described in terms of being used by a single user, this disclosure contemplates that many users may use one computer, or that one user may use multiple computers.

As used in this disclosure, a client 110 is intended to encompass a personal computer, touch screen terminal, workstation, network computer, kiosk, wireless data port, smart phone, personal data assistant (PDA), one or more processors within these or other devices, or any other suitable processing device. For example, each client 110 may comprise a computer that includes an input device, such as a keypad, touch screen, mouse, or other device that can accept user information, and an output device that conveys information associated with the operation of the server 105 (and hosted social networking service 125) or the client 110 itself, including digital data, visual information, the client application, or the GUI. Both the input and output device may receive input from and provide output to users of the clients 110 through the display, namely, the GUI. More specifically, each client device 110 can transmit and receive data over some form of radio link.

Further, the clients 110 may include a GUI comprising a graphical user interface operable to interface with at least a portion of environment 100 for any suitable purpose, including generating a visual representation of the client application (in some instances, the client 110's web browser) and the interactions with the hosted social networking service 125, including the responses received from the hosted social networking service 125 received in response to the requests sent by the client application. The illustrated client 110 also includes a memory that can store all or a portion of the social networking service 125 locally, as well as through the network 115. Generally, through the GUI, the user is provided with an efficient and user-friendly presentation of data provided by or communicated within the system 100.

The term "graphical user interface," or GUI, may be used in the singular or the plural to describe one or more graphical user interfaces and each of the displays of a particular graphical user interface. Therefore, the GUI can represent any graphical user interface, including but not limited to, a web browser, touch screen, or command line interface (CLI) that processes information in environment 100 and efficiently presents the information results to the user. In general, the GUI may include a plurality of user interface (UI) elements, some or all associated with the client application, such as interactive fields, pull-down lists, and buttons operable by the user at client 110. These and other UI elements may be related to or represent the functions of the client application, as well as other software applications executing at the client 110. In particular, the GUI may be used to present the client-based perspective of the hosted social networking service 125, and may be to view and navigate the hosted social networking service 125. For purposes of the present location, the GUI may be a part of or the entirety of the client application, while also merely a tool for displaying the visual representation of the client 110 and hosted social networking service's 125 actions and interactions. In some instances, the GUI and the client application may be used interchangeably, particularly when the client application represents a web browser associated with the hosted social networking service 125.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

In some implementations, a user carries a mobile device 110 in a GNSS-denied environment 103. The mobile device 110 communicates with the server 105 via the network 115 by an interface 135. The mobile device 110 also communicates with the communication towers 101 and identifies certain communication parameters 114. The mobile device 110 provides the communication parameters 114 to the server 105, which includes modules for social networking services 125, geo-referencing database 130, and related files 140. The server 105 then associates the provided communication parameters 114 with a geographical location from the geo-referencing database 130 and provides the mobile device 110 the geographical information. In some implementations, the correlation operation may be performed on the mobile device 110 itself, or in an external mainframe that stores additional geo-referencing data.

Figure 2:
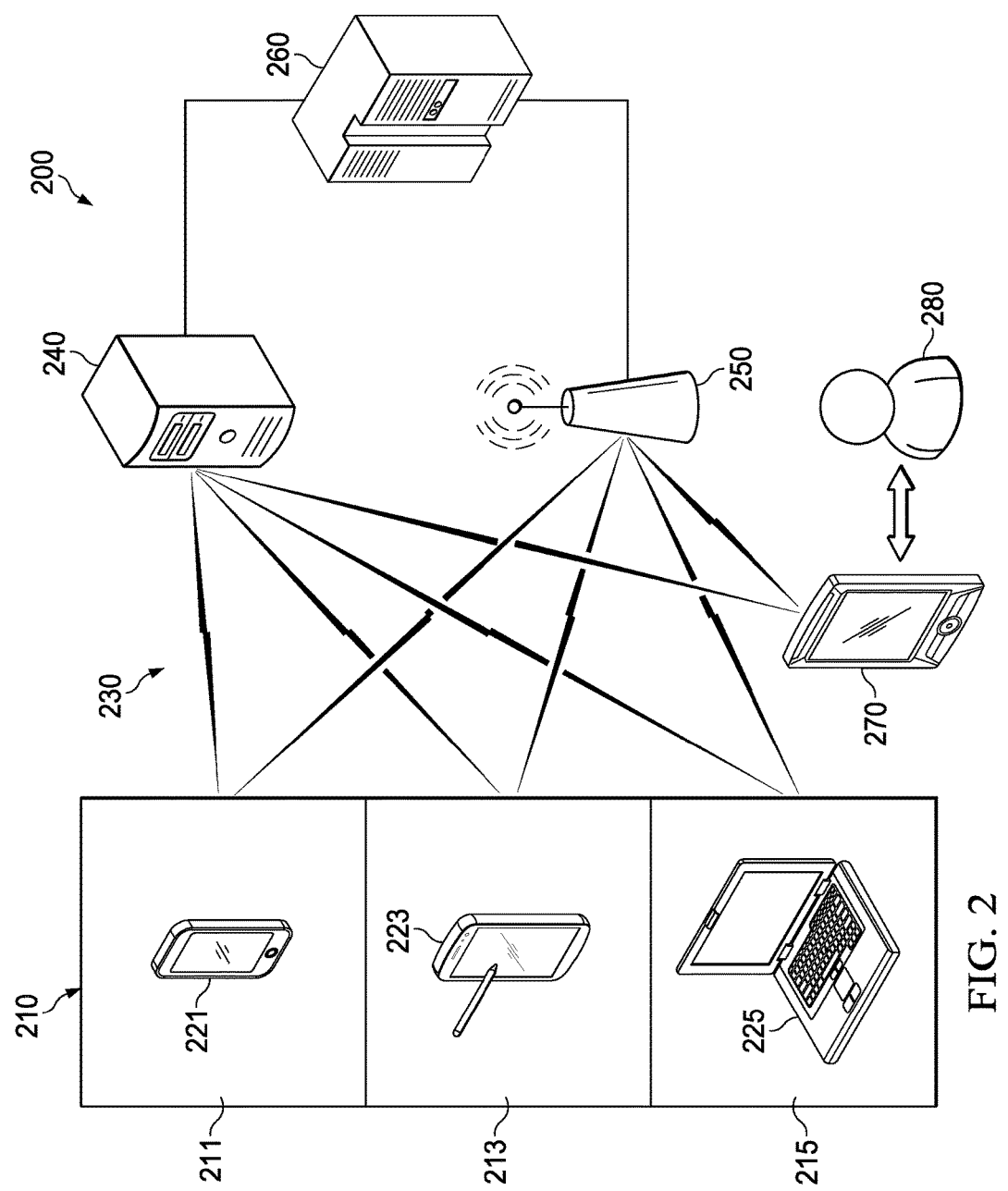
FIG. 2 is a schematic illustration of an example operation scenario for determining user location using harvested communication parameter observation.

FIG. 2 illustrates an example operation scenario 200 for determining device location using harvested communication parameter observation. The operation scenario 200 includes a GNSS-denied area 210 that surrounds a number of locations—such as stores 211, 213 and 215, a number of mobile devices 221, 223 and 225, a communication medium 230, a server 240, a communication tower 250, a database mainframe 260, and a user mobile device 270. The stores 211, 213, and 215 may be different department stores located in a close proximity in the GNSS-denied area 210, such as a shopping mall, for example. The user 280 may intend to locate the current location via the mobile device 270.

In this operation scenario 200, other users in the stores 211, 213, and 215 have previously uploaded the geographical information, such as the address, and/or the location description (e.g., relative position to other stores), with communication parameters, via mobile devices 221, 223, and 225 to a server 240. The mobile devices 221, 223 and 225 may be a personal computer, touch screen terminal, network computer, wireless data port, smart phone, personal data assistant (PDA), one or more processors within these or other devices, or any other suitable mobile processing device. For example, the mobile devices 221, 223 and 225 may comprise a computer that includes an input device, such as a keypad, touch screen, mouse, or other device that can accept user information, and an output device that conveys information associated with the operation of the server 240 or the mobile devices 221, 223 and 225 themselves, including digital data, visual information, applications, or GUI.

The mobile devices 221, 223 and 225, via communication with the communication tower 250, receive communication parameters included in the communication content transmitted across communication medium 230, and sends the communication parameters to the server 240. A mainframe database 260 may associate the reported observation saved in the server 240 and the provided communication parameters and construct a geo-referencing database that provides future inquiries, such as from the mobile device 270, a location reference. The mobile device 270 may communicate with the server 240 with the communication parameters and obtain information regarding its current location via the mainframe 260 database. This may be performed through the server 240, directly with the mainframe 260, and/or by onboard applications previously installed that share the database with the mainframe 260 and/or the server 240.

When a user self-identifies his or her location through a "checkin," the location information can be coupled with a report on the current radio parameters, country code, base station sector, Wi-Fi mac address, cell site neighbor information, etc., and other relevant information that may be used to help determine the device's location at a future time. The information may include data indicating whether the user was moving or stationary at the moment of the observation. Motion may be helpful in filtering out large uncertainties in the observation information.

Figure 3A:
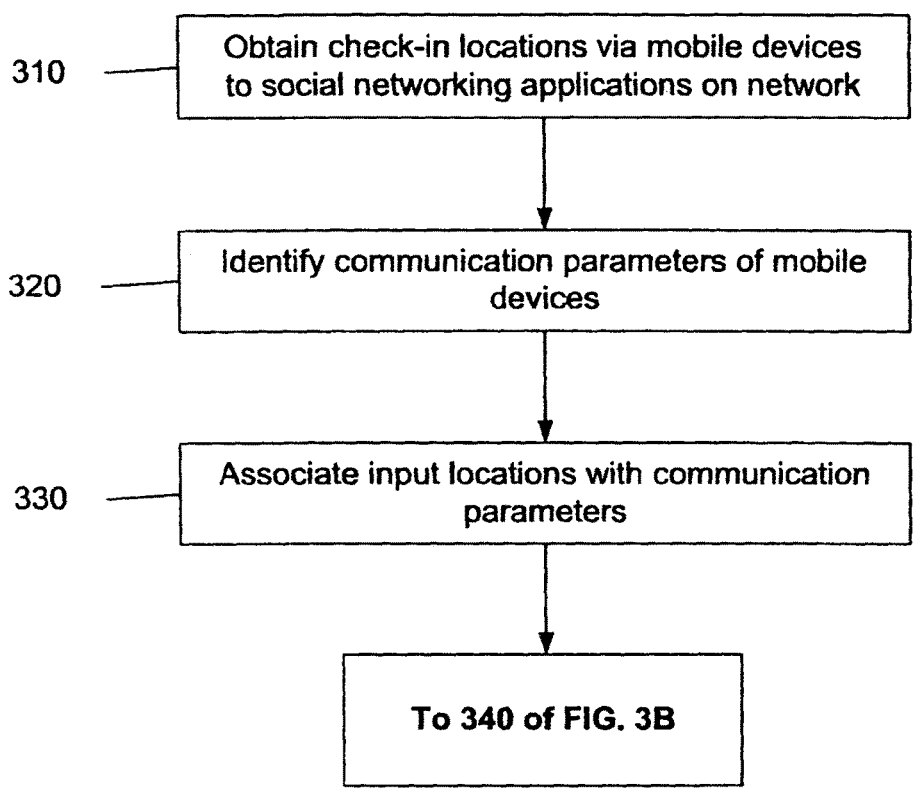
FIG. 3A is an example process flowchart for collecting location and communication parameter data at a mobile device.
Figure 3B:
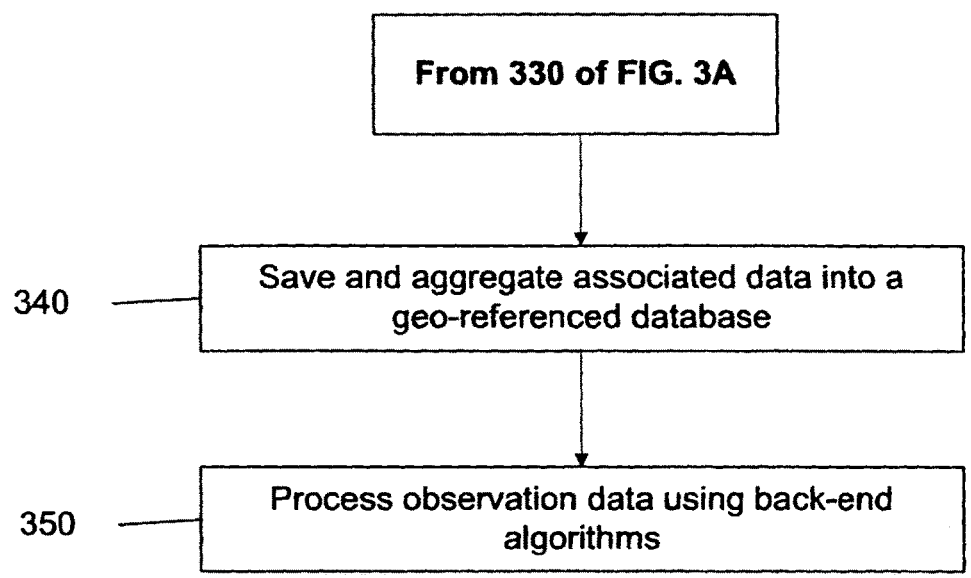
FIG. 3B is an example process flowchart for collecting location and communication parameter data at a network.

The observations from the device over time can be aggregated, and observations may be sent (e.g., in an anonymous manner) to a collection site when convenient, such as periods of low user activity or when synchronizing with other services. FIG. 3A-B shows a flowchart of the collection process on the mobile device and the network, respectively.

FIG. 3A is an example process flowchart 300 for collecting location and communication parameter data at a mobile device. The collection process occurs at the client side, such as on the mobile devices 110 in FIG. 1. Mobile device locations are obtained from the mobile devices themselves through a check-in features of a social networking application 310. In certain implementations, a user operating the mobile device can provide his or her location to a social networking application or website. This can be done in any number of ways, including by manual entry of the location or by a drop-down menu, combo-box control, list-box control, or by other ways. The mobile devices may be a personal computer, touch screen terminal, network computer, wireless data port, smart phone, personal data assistant (PDA), one or more processors within these or other devices, or any other suitable mobile processing device. The social networking applications may be a Web or Client-Server application that provides an interface to an individual user to set up an account to upload personal information such as name, profile, contact, geo-location, photo, video, events, etc. and to connect with other user accounts to form an online social network, such as TWITTER, FACEBOOK, GOOGLE BUZZ, GOOGLE+, or any other social networking service that provides users to report their geographical locations.

The communication parameters of the mobile device may be identified 320. The communication parameters may be requested and obtained by a subcomponent of the mobile device based on the input of location information into the mobile device (e.g., through the social networking application). The parameters may be received from another subcomponent of the mobile device or from the network. The communication parameters may include received signal strength from one or more communication towers 101 or from Wi-Fi beacons at home or work addresses; country code; base station sector; cell site neighbor information; timing information; motion status, etc. The input locations may be associated with the communication parameters 330.

The process may continue on FIG. 3B at the network. FIG. 3B is an example process flowchart 360 for collecting location and communication parameter data at a network. The input locations and communications parameters that were associated together can be stored and aggregated in a geo-reference database 340. The database may be stored on a network server. The database may store, define, and/or save specific data about a particular location and its corresponding communication parameters. The data may include data regarding location address, description, relative position with other locations, distance to a landmark, and direction instructions. The data (which may be referred to as observation data) can be processed using back-end algorithms 350. For example, in order to be useful for improving indoor location estimations, the collections of observations may be further processed using a sequence of back-end algorithms to convert the user-entered location information into data useful for estimating indoor location using the reported communication parameters. In some implementations, the location entered by the user may be the name of a business or the user may type in an address. Either way, the information can be translated into a coordinate using a geo-location lookup process, resulting in a latitude/longitude combination with an estimate of the uncertainty of the location. The steps described in FIGS. 3A-B may be performed by a mobile device, a network or network server, or a combination of the two.

Figure 4A:
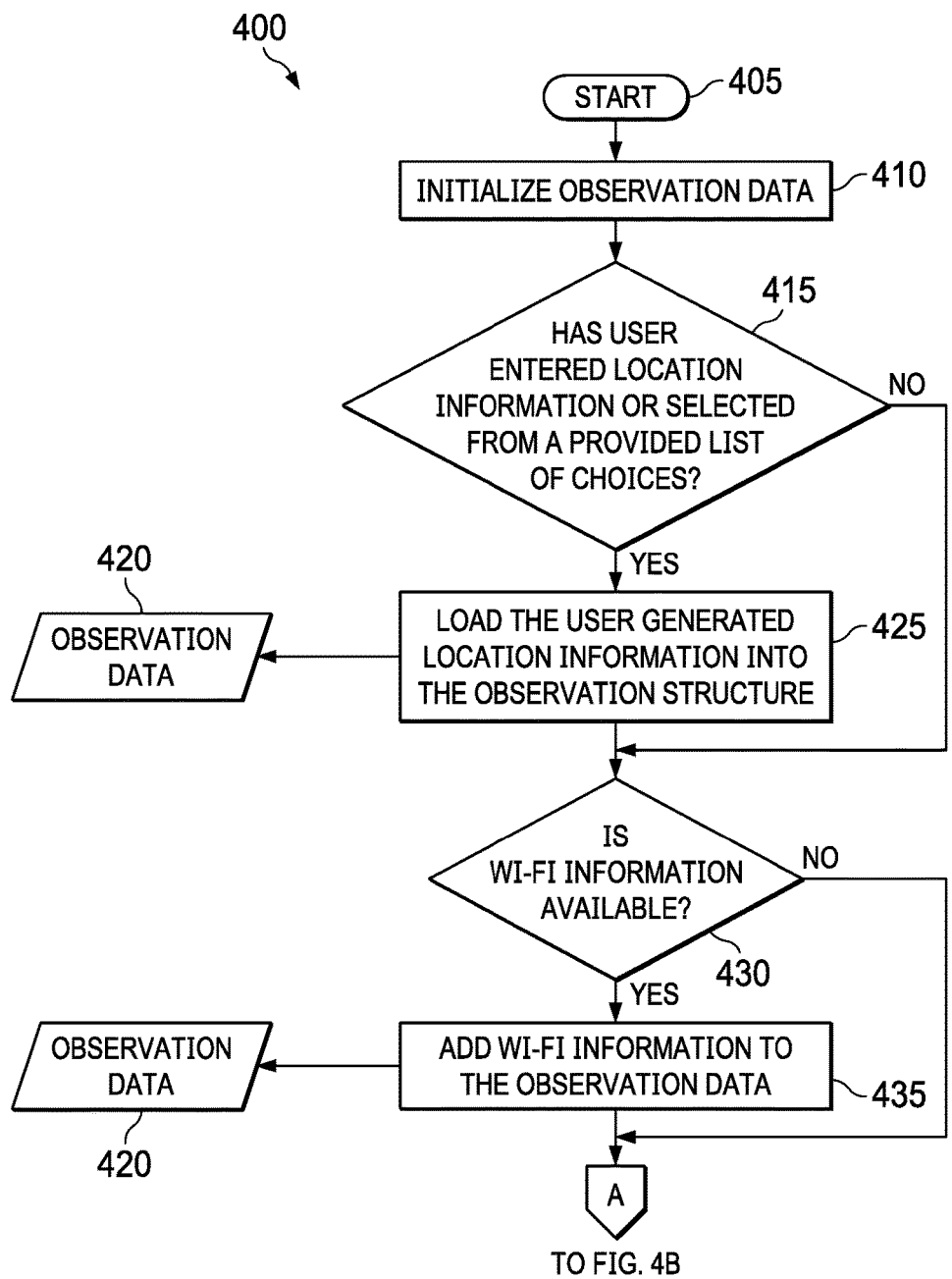
FIG. 4A-B is an example process flowchart for harvesting location and communication parameter data at a mobile device.
Figure 4B:
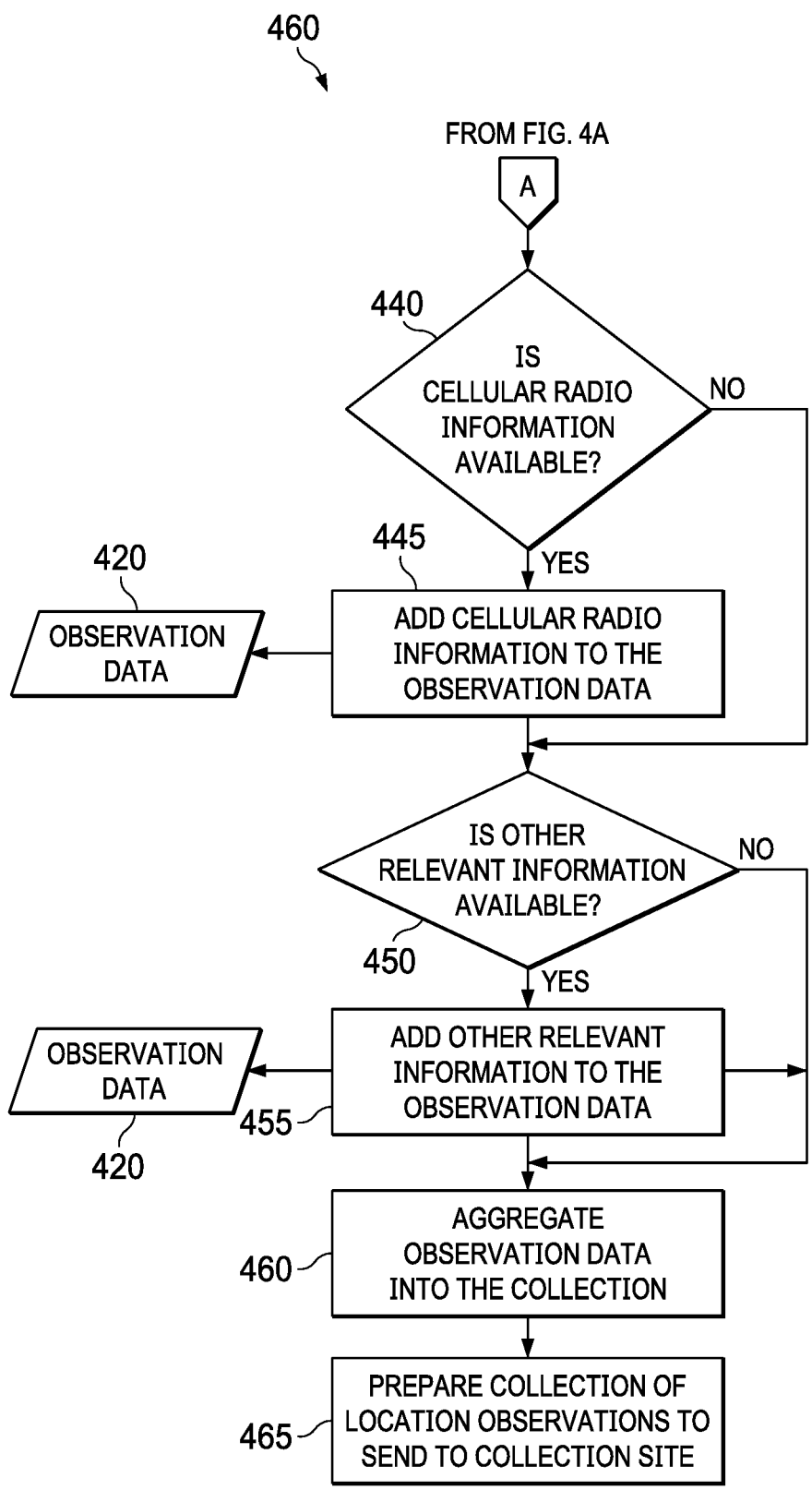

FIG. 4A-B is an example process flowchart 400 for harvesting location and communication parameter data at a mobile device. FIG. 4A-B is a single process flow 400 broken up into two sub-figures for convenience. The collection process initiates at step 405 where the algorithm starts. At step 410, observation data are initialized. The initialization may include loading previous data and updating the data buffer with the current communication parameters. The update process at step 415 examines if the user has entered location information or selected from a provided list of choices. If the user has entered location information or selected from a provided list of location choices, then the algorithm proceeds to step 425 where the user-generated location information is loaded to the observation data structure 420.

At step 415, if the user has not yet entered location information or selected from a provided list of location choices, then the algorithm continues to step 430. At step 430, the algorithm examines if Wi-Fi (wireless Internet) information is available. If Wi-Fi information is available, then the Wi-Fi information is added to the observation data at step 335. If Wi-Fi information is not available, then the algorithm proceeds to step 440, which is also the next step after step 435 where Wi-Fi information is added to the observation data 420.

At step 440, the algorithm examines if cellular radio information is available. If cellular radio information is available, then the algorithm proceeds to the next step 445 where the cellular radio information is added to the observation data 420. If the cellular radio information is not available, then the algorithm proceeds to the step 450, which is also the next step after step 445 where the cellular radio information is added to the observation data 420.

At step 450, the algorithm examines if other relevant information is available. If other relevant information is available, then the relevant information is added to the observation data at step 455. If other relevant information is not available, then the algorithm proceeds to step 460, which is also the next step after step 455 where observation data is aggregated into a collection. The collection of location observations is then prepared at 465 for sending to a collection site, such as the geo-reference database 130 in FIG. 1.

In some implementations, the collection of communication parameters may be used to create a pattern that may be used for matching future location queries. This matching may contain a range of values that are considered to match the pattern within a desirable tolerance. In some implementations, the reported location information regarding a same entity may be scattered due to the actual location and time of reporting, and certain signal processing techniques may be applied to further improve the accuracy of the location information. For example, an average value of the communication parameter over a representative amount of entries may better represent the actual correlation of the communication parameters and location information. A standard deviation threshold may be used to examine whether a new reported observation is reliable or whether the report contains large errors due to the user's movement.

Figure 5:
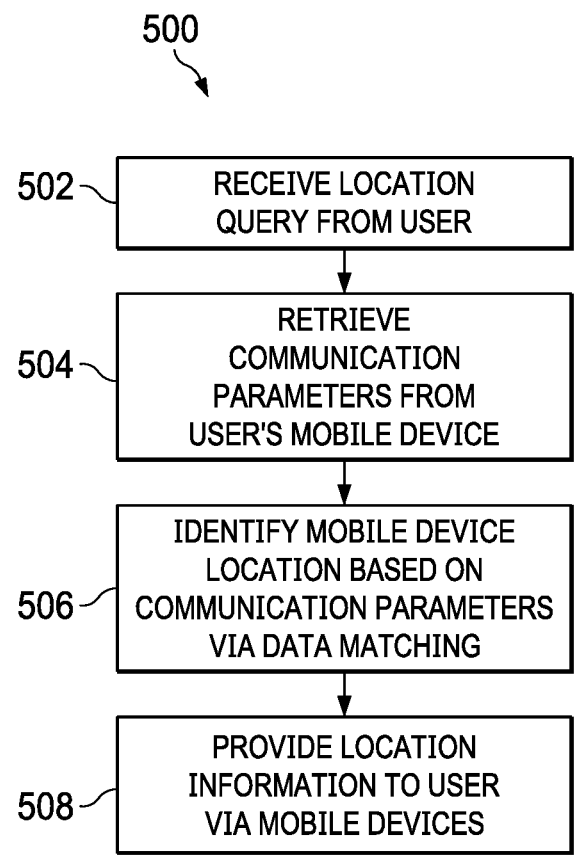
FIG. 5 is a process flowchart for using harvested observed data for determining geographical locations of a current mobile device.

FIG. 5 is a process flowchart 500 for using harvested observed data for determining geographical locations of a current mobile device. At step 502, a user may submit a location query to the network server. At step 504, the network server retrieves the current communication parameters of the user's mobile device. At step 506, the network server examines the communication parameters in the geo-referenced database via data matching and identifies the current mobile device location based on the communication parameters. At step 508, the network server provides the correlated location information to user via the mobile device. The processes described for FIG. 5 may be performed on a mobile device, a network or network server, or some combination thereof.

The collections of observations may be further processed using a sequence of backend algorithms to convert the user-entered location information into data useful for estimating indoor locations using the reported radio parameters. For example, the location entered by the user may be the name of a business or the user may type in an address. Either way, the information would be translated into a coordinate using a geolocation lookup process, resulting in a latitude/longitude combination with an estimate of the uncertainty of the location.

Alternatively, the collection of radio parameters may be used to create a pattern that may be used for matching future location queries. This matching may contain a range of values that are considered to match the pattern within a desirable tolerance.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a system having a display device, e.g., a screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, at a server, location information from user input received through a mobile device, the location information indicating a name or an address of a location of the mobile device operated by a user in a global navigation satellite system (GNSS)-location-denied environment;
    identifying, at the server, one or more communication parameters associated with communications between the mobile device and a network, wherein the one or more communication parameters include cell site neighbor information and timing information;
    associating, at the server, the one or more communication parameters with the name or the address of the location of the mobile device independent of coordinates from a GNSS;
    aggregating, at the server, location information and communication parameters associated with a plurality of mobile devices, the plurality of mobile devices including the mobile device, the location information associated with the plurality of mobile devices including the location information received through the mobile device, and the communication parameters associated with the plurality of mobile devices including the identified one or more communication parameters associated with the mobile device, wherein the aggregating comprises:
    determining whether a particular communication parameter associated with a particular location is reliable based on a standard deviation threshold of communication parameters that are associated with the particular location; and
    aggregating the communication parameters that are determined to be reliable;
    receiving, at the server, a location query from a different mobile device, wherein the different mobile device is other than the plurality of mobile devices;
    receiving, at the server, a current communication parameter of the different mobile device, wherein the current communication parameter includes cell site neighbor information, and timing information associated with the different mobile device; and providing, from the server to the different mobile device, a location of the different mobile device based on the current communication parameter of the different mobile device and the aggregated location information and the communication parameters from the plurality of mobile devices.

2. The method of claim 1, wherein the communication parameters include information identifying whether the mobile device is in motion.

3. The method of claim 1, wherein the location information indicating the location of the mobile device includes information provided through a check-in feature of a social networking application.

4. The method of claim 1, wherein the location information indicating the location of the user is based on information provided through a user interface feature allowing specifying location related information.

5. The method of claim 4, wherein the user interface feature is a drop-down menu.

6. The method of claim 4, wherein the user interface feature is a combo-box control.

7. The method of claim 4, wherein the user interface features is a list-box control.

8. The method of claim 1, wherein the location information indicating the location of the mobile device includes information provided through a location-enabled social application.

9. The method of claim 1, wherein the user self-identifies their physical location as part of a location-enabled application.

10. The method of claim 1 the method further comprising:
    storing location information about the mobile device over a period of time;
    storing communication parameters associated with the location information over the period of time;
    aggregating the location information and the communication parameters from the mobile device; and
    identifying the location of the different mobile device based on at least one of the aggregated location information and the communication parameters from the mobile device.

11. A system comprising:
    one or more hardware processors operable to:
    receive, at a server, location information from user input received through a mobile device, the location information indicating a name or an address of a location of the mobile device operated by a user in a global navigation satellite system (GNSS)-location-denied environment;

identify, at the server, one or more communication parameters associated with communications between the mobile device and a network, wherein the one or more communication parameters include cell site neighbor information and timing information;

associate, at the server, the one or more communication parameters with the name or the address of the location of the mobile device independent of coordinates from a GNSS;

aggregate, at the server, location information and communication parameters associated with a plurality of mobile devices, the plurality of mobile devices including the mobile device, the location information associated with the plurality of mobile devices including the location information received through the mobile device, and the communication parameters associated with the plurality of mobile devices including the identified one or more communication parameters associated with the mobile device, wherein the aggregating comprises:

determining whether a particular communication parameter associated with a particular location is reliable based on a standard deviation threshold of communication parameters that are associated with the particular location; and aggregating the communication parameters that are determined to be reliable;

receive, at the server, a location query from a different mobile device;

receive, at the server, a current communication parameter of the different mobile device, wherein the current communication parameter includes cell site neighbor information, and timing information associated with the different mobile device, wherein the different mobile device is other than the plurality of mobile devices; and provide, from the server to the different mobile device, a location of the different mobile device based on the current communication parameter of the different mobile device and the aggregated location information and the communication parameters from the plurality of mobile devices.

12. The system of claim 11, wherein the communication parameters include information identifying whether the mobile device is in motion.

13. The system of claim 11, wherein the location information indicating the location of the mobile device includes information provided through a check-in feature of a social networking application.

14. The system of claim 11, wherein the location information indicating the location of the mobile device includes information provided through a location drop-down menu.

15. The system of claim 11, wherein the location information indicating the location of the mobile device includes information provided through a location-enabled social application.

16. The system of claim 11, wherein the user self-identifies their physical location as part of a GNSS-location-enabled application.

17. The system of claim 11 further comprising:

storing location information about the mobile device over a period of time;

storing communication parameters associated with the location information over the period of time;

aggregating the location information and the communication parameters from the mobile device; and identifying the location of the different mobile device based on at least one of the aggregated location information and the communication parameters from the mobile device.

\* \* \* \* \*

UNITED STATES PATENT AND TRADEMARK OFFICE
CERTIFICATE OF CORRECTION

PATENT NO. : 9,942,698 B2
APPLICATION NO. : 14/237748
DATED : April 10, 2018
INVENTOR(S) : Bernhardt et al.

Page 1 of 1

It is certified that error appears in the above-identified patent and that said Letters Patent is hereby corrected as shown below:

On the Title Page

Item (57), ABSTRACT, Lines 3-4, Delete "global positioning navigation satellite system (GNSS)" and insert -- global navigation satellite system (GNSS) --, therefor.

Signed and Sealed this
Sixth Day of November, 2018

Andrei Iancu
*Director of the United States Patent and Trademark Office*